United States Patent
Dasgupta et al.

(10) Patent No.: US 11,323,512 B2
(45) Date of Patent: May 3, 2022

(54) PEER TO PEER INFRASTRUCTURE MANAGEMENT ARCHITECTURE

(71) Applicant: Hewlett Packard Enterprise Development LP, Houston, TX (US)

(72) Inventors: Subhajit Dasgupta, Austin, TX (US); Charles E. Fowler, Fort Collins, CO (US); Michelle Frolik, Houston, TX (US); Charles Greenidge, Fort Collins, CO (US); Jerry Harrow, Brookline, NH (US); Sandesh V. Madhyastha, Bangalore Karnataka (IN); Clifford A. McCarthy, Plano, TX (US); Abhay Padlia, Bangalore Karnataka (IN); Rajeev Pandey, Corvallis, OR (US); Jonathan M. Sauer, Milpitas, CA (US); Geoffery Schunicht, Houston, TX (US); Latha Srinivasan, Milpitas, CA (US); Gary L. Thunquest, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/707,869

(22) Filed: Dec. 9, 2019

(65) Prior Publication Data
US 2021/0176309 A1 Jun. 10, 2021

(51) Int. Cl.
*H04L 29/08* (2006.01)
*H04L 67/1074* (2022.01)
(Continued)

(52) U.S. Cl.
CPC ........ *H04L 67/1078* (2013.01); *H04L 47/827* (2013.01); *H04L 67/2842* (2013.01); *G06F 9/455* (2013.01)

(58) Field of Classification Search
None
See application file for complete search history.

(56) References Cited

U.S. PATENT DOCUMENTS 8,800,055 B2   8/2014   Murakami et al.
9,110,843 B2   8/2015   Chiu et al.
(Continued)

OTHER PUBLICATIONS

Google Cloud, "Multi-cluster Management Overview," Aug. 12, 2019, pp. 1-2, Retrieved from the Internet on Nov. 7, 2019 at URL: <https://cloud.google.com/anthos/multicluster-management/>.
(Continued)

*Primary Examiner* — James A Edwards
(74) *Attorney, Agent, or Firm* — Trop, Pruner & Hu, P.C.

(57) ABSTRACT

A system to facilitate infrastructure management is described. The system includes a plurality of management controllers each having a control function of a plurality of infrastructure devices and a state cache storing a state of the plurality of infrastructure devices, including a first management controller to initiate an operation to be performed on a first set of resources. The system also includes a plurality of infrastructure controllers, each having a state repository to maintain a state function of the plurality of infrastructure devices, including a first infrastructure controller associated with the first set of resources to perform the operation on the first set of resources, update a first state repository including an updated state of the first set of resources in response to the operation and broadcast the updated state of the first set of resources to each of the plurality of management controllers.

20 Claims, 8 Drawing Sheets

(51) Int. Cl.
*H04L 47/70* (2022.01)
*H04L 67/568* (2022.01)
*G06F 9/455* (2018.01)

(56) References Cited

U.S. PATENT DOCUMENTS

| | | | |
|---|---|---|---|
| 9,288,555 B2* | 3/2016 | Srinivas | H04L 41/12 |
| 2002/0188655 A1 | 12/2002 | Brown et al. | |
| 2004/0003063 A1* | 1/2004 | Ashok | G06F 9/5077 |
| | | | 709/221 |
| 2007/0101430 A1* | 5/2007 | Raikar | H04L 63/1416 |
| | | | 726/24 |
| 2010/0223466 A1* | 9/2010 | Roskowski | H04N 21/25866 |
| | | | 713/168 |
| 2014/0281656 A1 | 9/2014 | Ruesch et al. | |
| 2015/0006338 A1* | 1/2015 | Vasantham | G06F 16/00 |
| | | | 705/28 |
| 2015/0046592 A1* | 2/2015 | Patel | H04L 67/1036 |
| | | | 709/226 |
| 2015/0046922 A1* | 2/2015 | Allen | G06F 9/5005 |
| | | | 718/1 |
| 2015/0058471 A1* | 2/2015 | McPherson | H04L 12/1432 |
| | | | 709/224 |
| 2016/0043968 A1* | 2/2016 | Jacob | G06F 9/5061 |
| | | | 709/226 |
| 2016/0198003 A1* | 7/2016 | Luft | H04L 67/2823 |
| | | | 709/225 |
| 2017/0200240 A1* | 7/2017 | Marinelli | H04L 41/0681 |
| 2017/0214762 A1* | 7/2017 | Swain | H04L 51/26 |
| 2018/0167319 A1* | 6/2018 | Qian | H04L 45/302 |
| 2020/0218566 A1* | 7/2020 | Maes | G06F 9/505 |
| 2020/0379793 A1* | 12/2020 | Parihar | G06F 9/45558 |
| 2021/0019194 A1* | 1/2021 | Bahl | G06F 9/50 |

OTHER PUBLICATIONS

Paul Murray, "The Anubis Service," Jun. 8, 2005, pp. 1-24, Hewlett-Packard Laboratories, Bristol, United Kingdom.

Pooja Khorjuvekar. "What is Anthos: The Mulicloud Platform by Google (in 7 mins)," May 3, 2019, pp. 1-5, Cuelogic Technologies, Retrieved from the internet on Nov. 7, 2019 at URL: <https://www.cuelogic.com/blog/what-is-anthos-the-multicloud-platform-by-google>.

The Kubernetes Authors, "Set up High-availability Kubernetes Masters," Jun. 12, 2019, pp. 1-7, Retrieved from the Internet on Oct. 11, 2019 at URL: <kubernetes.io/docs/tasks/administer-cluster/highly-available-master/>.

* cited by examiner

Input:
* Compute: DL
* Connection to: Network A

Output on "can I create?" Query:
* status: yes
* "cost" i.e. what resources would be consumed Output on creation:
* Status created
* DL1 [MAC 1A]

Input:
- Compute: 2 DL's
- Connection to: Network A
- Private network between
- Shared storage between Output on "can I create?" Query:
- status yes
- "cost" i.e. what resources would be consumed Output on creation:
- Status created
- DL1 [MAC 1A, MAC 1B, MAC SAN1]
- DL2 [MAC 2A, MAC 2B, MAC SAN2]
- Shared Storage [URI]

PEER TO PEER INFRASTRUCTURE MANAGEMENT ARCHITECTURE

BACKGROUND

A cloud service may refer to a service that includes infrastructure resources (a compute resource, a storage resource, a networking resource, etc.) connected with each other and/or platforms. Such infrastructure resources can collectively be referred to as "cloud resources." A host (also referred to as a cloud service provider) may, as example, provide Software as a Service (SaaS) by hosting applications or other machine-readable instructions; Infrastructure as a Service (IaaS) by hosting equipment (servers, storage components, network components, etc.); or a Platform as a Service (PaaS) by hosting a computing platform (operating system, hardware, storage, and so forth).

A hybrid cloud is a public and/or private cloud environment at which IaaS or PaaS is offered by a cloud service provider. The services of the public cloud may be used to deploy applications. In other examples, a hybrid cloud may also offer SaaS, such as in examples where the public cloud offers the SaaS as a utility (e.g. according to a subscription or pay as you go model). Hybrid clouds implement virtualization technology to deploy a virtual infrastructure based on native hardware. Virtualization technology has typically been employed via virtual machine (VMs), with each application VM having a separate set of operating system, networking and storage.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
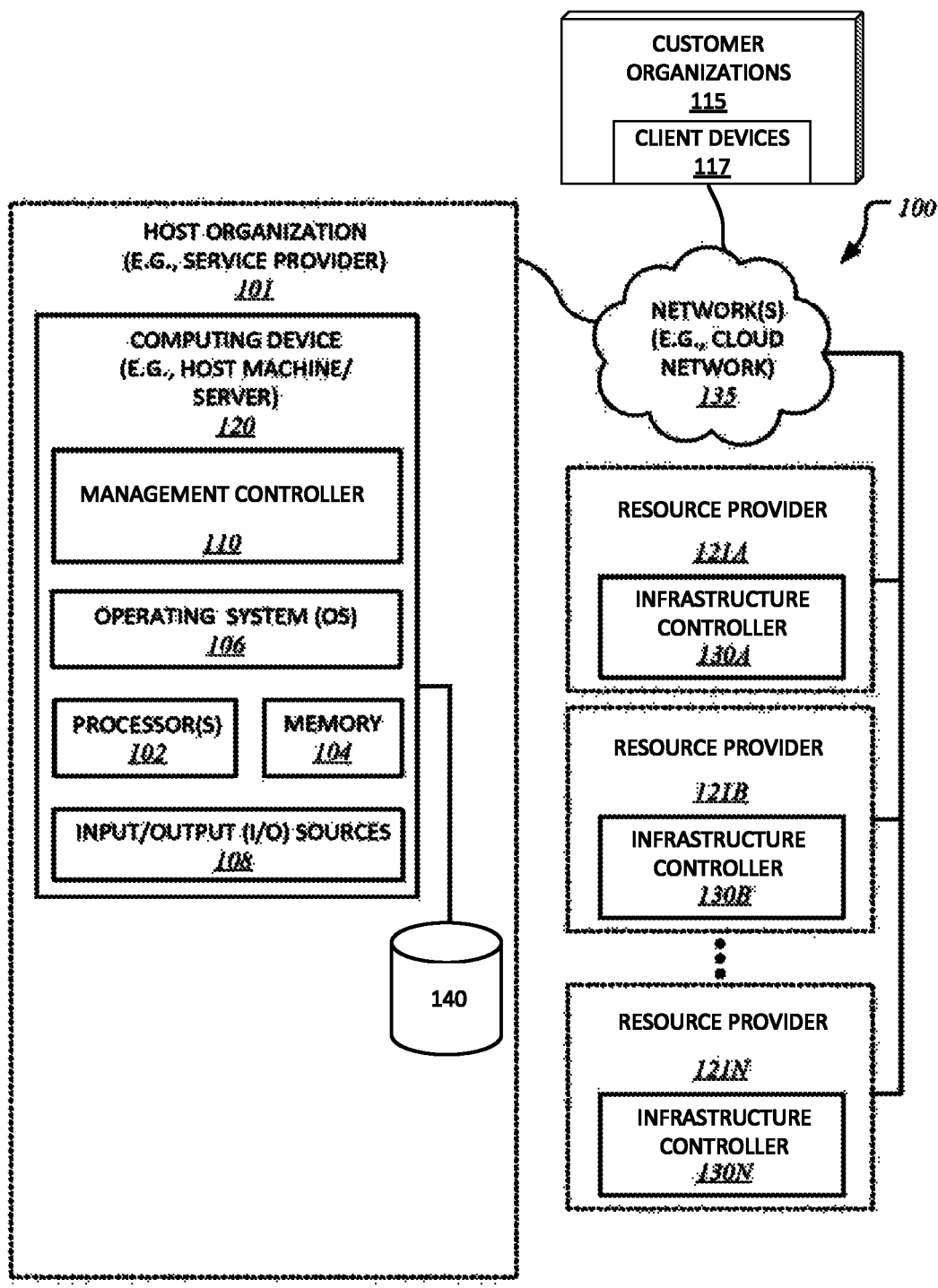
FIG. 1 illustrates one embodiment of an infrastructure management system.

In embodiments, an infrastructure management platform is provided to facilitate infrastructure management services between a client organization and one or more infrastructure resource provider organizations. In such embodiments, a management controller microservice maintains a control function to manage physical infrastructure resources via a plurality of on-premise infrastructure controllers, while the infrastructure controllers maintain a state function for each of its respective resources.

Currently, management of infrastructure resources is provided by on-premise infrastructure controllers. However, these infrastructure controllers only have a capability of controlling resources that are physically on-premise (e.g., within the same data center). Such a configuration precludes the management of resources at multiple sites via a single controller.

According to one embodiment, a cloud micro-service controller is implemented to control all resources within an infrastructure management platform. In such an embodiment, the micro-service controller provides a device management function, while the on-premise infrastructure controllers maintain the state function of infrastructure devices/applications. Thus, a single management controller may provide remote management of infrastructure devices/applications at different data centers.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of an infrastructure management system 100 having a computing device 120 employing a management controller 110. In one embodiment, management controller 110 is a microservice that facilitates management of physical infrastructure resources provided by a plurality of infrastructure services organizations. In a further embodiment, management controller 110 enables the management of those resources on behalf of a plurality of client (or customer) organizations via a declarative description (or Blueprint) that specifies resources requested by the client. In such an embodiment, a Blueprint provides an abstract description of compute, storage, networking and OS image resources that can be allocated and configured together to operate a virtual machine (VM) cluster or software application. Accordingly, Blueprints serve as a high level description used to request an execution venue (or venue) for deployment of application workloads via management controller 110. In one embodiment, a venue may be defined as an environment at which client workloads may be executed.

As shown in FIG. 1, computing device 120 includes a host server computer serving as a host machine for employing management controller 110, which provides a platform to facilitate management of infrastructure resources on behalf of customer organizations (or clients) 115 via a PaaS or IaaS. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 117, etc. Computing device 120 further includes processor(s) 102, memory 104, input/output ("I/O") sources 108, such as touchscreens, touch panels, touch pads, virtual or regular keyboards, virtual or regular mice, etc. In one embodiment, management controller 110 may be executed by a separate processor application specific integrated circuit (ASIC) than processor 102. In a further embodiment, management controller 110 may act out of band, and may be on a separate power rail, from processor 102. Thus, management controller 110 may operate on occasions in which processor 102 is powered down.

In one embodiment, host organization 101 may further employ a production environment that is communicably interfaced with client devices 117 at customer organizations 115 through host organization 101. Client devices 117 may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process data on behalf of customer organizations 115. In some embodiments, host organization 101 receives input and other requests from a plurality of customer organizations 115 over one or more networks 135; for example, incoming data, or other inputs may be received from customer organizations 115 to be processed using database system 140.

In one embodiment, each customer organization 115 is an entity selected from a group consisting of a separate and distinct remote organization, an organizational group within host organization 101, a business partner of host organization 101, a customer organization 115 that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify services from host organization 101 are to be provided. Further, host organization 101 may implement a request interface via the web server or as a stand-alone interface to receive requests packets or other requests from the client devices 117. The request interface may further support the return of response packets or other replies and responses in an outgoing direction from host organization 101 to one or more client devices 117.

In one embodiment, computing device 120 may include a server computer that may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 117, over one or more networks, such as network(s) 135.

In one embodiment, computing device 120 may serve as a service provider core for hosting and management controller 110 as a SaaS or IaaS, and be in communication with one or more client computers 117, over one or more network(s) 135, and any number and type of dedicated nodes. In such an embodiment, host organization 101 provides infrastructure management to resources provided by resource providers 121A-121N. Resource providers 121A-121N represent separate infrastructure resource providers that offer services to provide hardware resources (e.g., compute, storage, network elements, etc.) or software resources. In a further embodiment, one or more of providers 121A-121N may provide a virtualization of its resources as a virtualization infrastructure for virtualization of its resources. In this embodiment, computing device 120 resources and/or one or more of the physical infrastructure resources provided by providers 121A-121N may be configured as one or more Point of Developments (PODs) (or instance machines), where an instance machine (or instance) comprises a cluster of infrastructure (e.g., compute, storage, software, networking equipment, etc.) that operate collectively.

According to one embodiment, each of the providers 121A-121N implement an on-premise infrastructure controller 130 to control its respective resources. In this embodiment, each infrastructure controller 130 represents an on-premise infrastructure system (e.g., data center) that provides one or more infrastructure elements (e.g., an instance of managed infrastructure) of its respective resources. In one embodiment, each infrastructure controller 130 may comprises one or more software-defined networking (SDN) controllers that provide on-premises infrastructure management of physical infrastructure resources, such as a OneView® Infrastructure Management System. However other embodiments may implement different infrastructure management systems.

Figure 2:
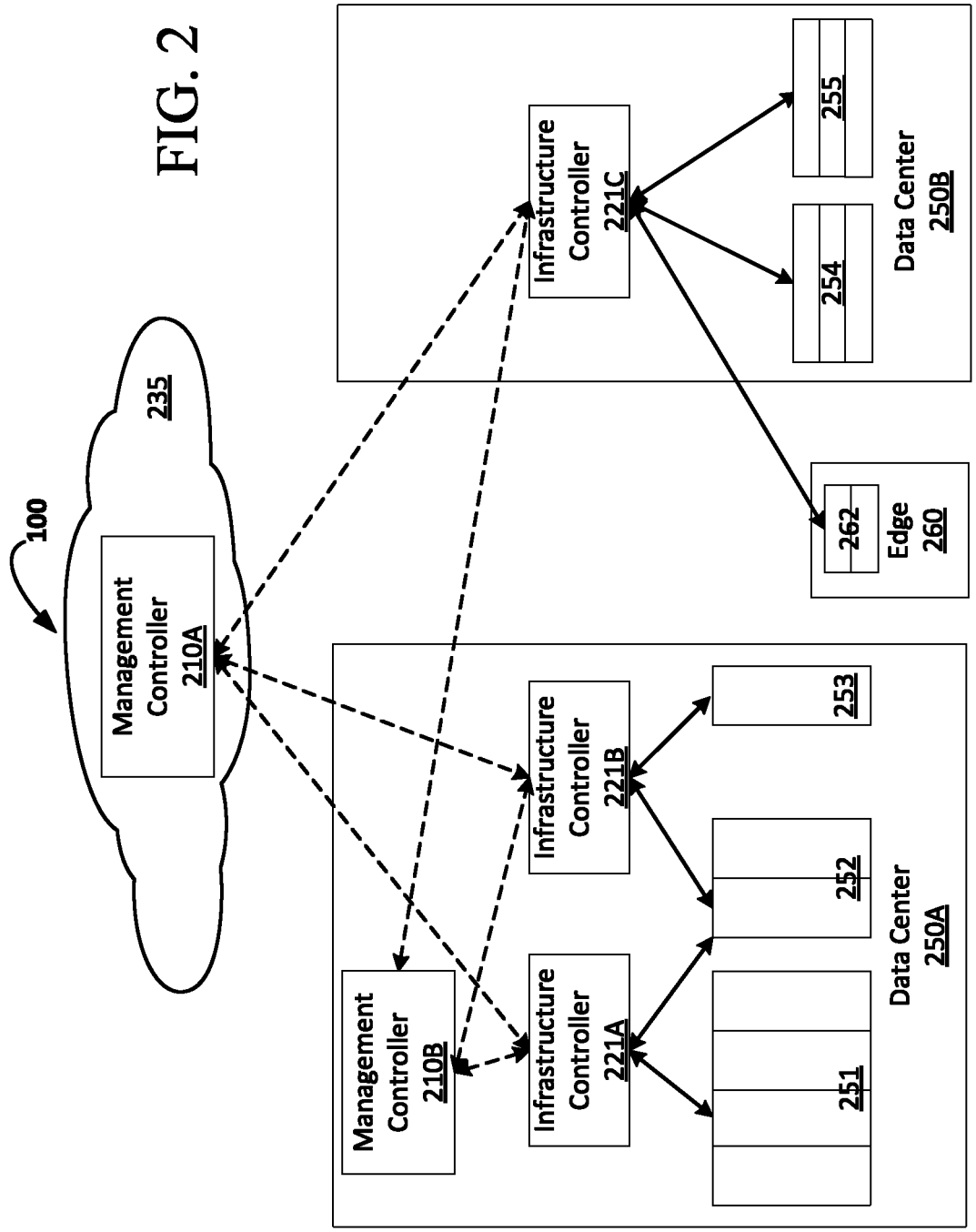
FIG. 2 is a block diagram illustrating another embodiment of an infrastructure management system.

FIG. 2 is a block diagram illustrating another embodiment of an infrastructure management system 100. As shown in FIG. 2, infrastructure management system 100 may include the management of resources within data centers or edge devices. For example, infrastructure management system 100 includes a data center 250A having resources 251-253, data center 250A having resources 254 and 255, and an edge device 260 having resources 262 (e.g., routers, routing switches, integrated access devices (IADs), multiplexers, etc.). Additionally, data center 250A includes infrastructure controllers 221A and 221B. In one embodiment, infrastructure controller 221A manages one or more resources within each of resources 251 and 252, while infrastructure controller 221B manages one or more resources within each of resources 251 and 252. Similarly, infrastructure controller 221C manages resources within each of resources 254 and 255 within data center 250B, as well as resources 262 within edge device 260.

According to one embodiment, management controllers 210 are coupled to the infrastructure controller 221. For example, management controller 210A is a cloud controller (e.g., as discussed in FIG. 1) that manages all of the resources via infrastructure controllers 221A-221C. However in other embodiments, a management controller 210 may be implemented outside of the cloud. For example, management controller 210B may be physically located in data center 250A to manage all of the resources via infrastructure controllers 221A-221C. During an initial registration of an infrastructure controller 221, a controller 221 transmits to controller 210 a full list of resources that it controls. For example, infrastructure controller 221C may inform each management controller 210 that it controls resources 254, 255 and 262.

Figure 3:
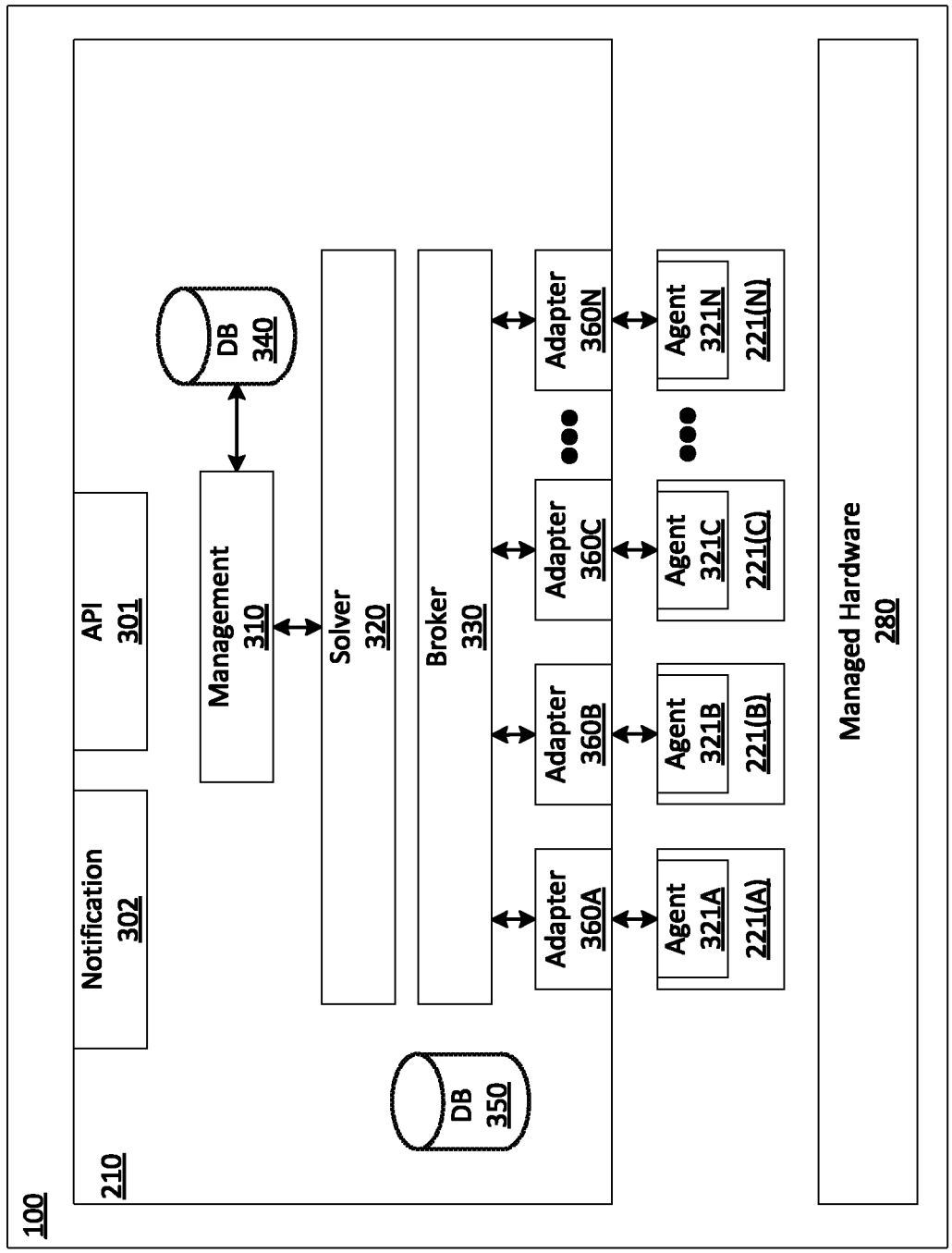
FIG. 3 illustrates yet another embodiment of an infrastructure management system.

FIG. 3 illustrates yet another embodiment of an infrastructure management system 100, including a management controller 210 and infrastructure controllers 221A-221N that directly control managed resources 280. According to one embodiment, management controller 210 includes an application programming interface (API) 301 to receive Blueprints from clients (e.g., client device 117 in FIG. 1). As discussed above, a Blueprint is an abstract description of compute, storage, networking and OS image resources to be allocated to a client as a unit of compute/venue for workload deployment. For example, a Blueprint may specify that "I want a DL server on Network A", or "I want a pair of DL servers on Network A, with a private network between them and shared storage."

Figure 4A:
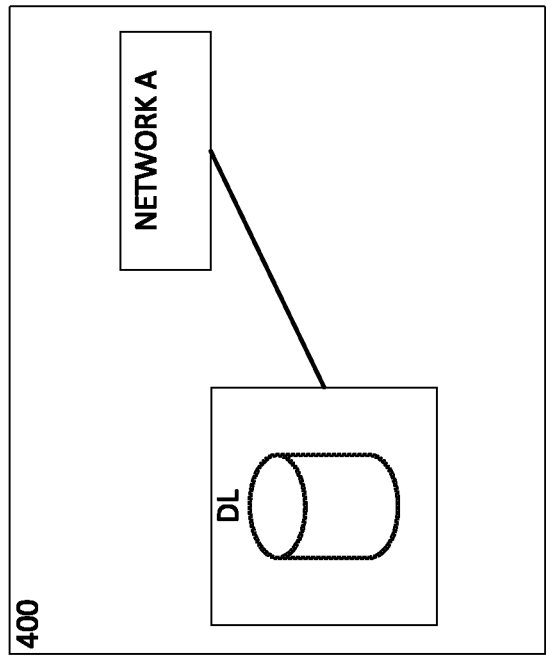
FIG. 4A and FIG. 4B illustrate embodiments of deployed infrastructure using Blueprints.
Figure 4B:
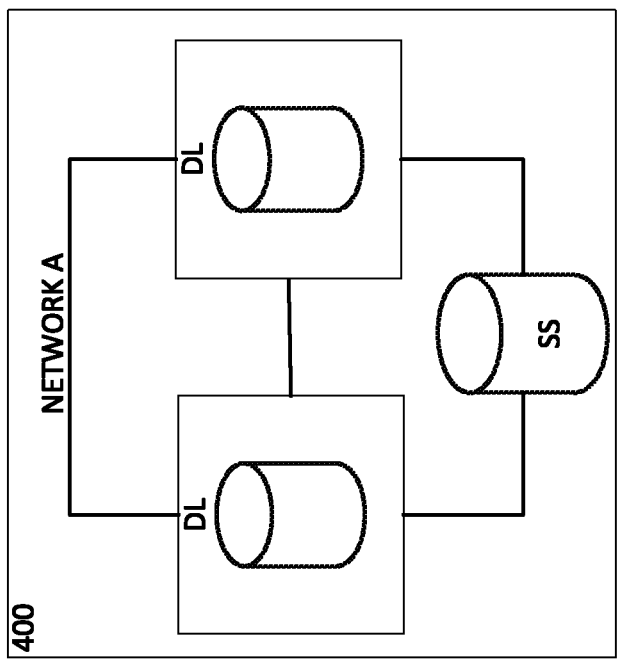

Management engine 310 receives a Blueprint via API 301 and tracks all transaction via a database 340. In one embodiment, a solver engine 320 receives the Blueprint from management engine 310 and translates the Blueprint into a set of high level steps (or Recipe) needed to instantiate the requested resources. FIG. 4A and FIG. 4B illustrate embodiments of deployed infrastructure 400 using Blueprints. As shown in FIG. 4A and FIG. 4B, the above exemplary Blueprint statements are converted to inputs and outputs, as well as an output on creation. In other embodiments, a Blueprint may include a statement to discontinue or remediate existing allocated resources.

Once the Blueprint conversion is performed, solver engine 320 creates a blueprint instance associated of the Blueprint and forwards a resource request to broker 330, which broadcasts the request to the infrastructure controllers 221. According to one embodiment, broker 330 broadcasts requests to infrastructure controllers 221 via adapters 360. In such an embodiment, each adapter 360 operates as a bridge to an infrastructure manager 221. Thus, adapters 360A-360N are implemented to interface with 221A-221N. In a further embodiment each adapter 360 is communicatively coupled to an agent 321 within an infrastructure controller 221. In this embodiment, an agent 321 operates as an on-premise component that performs functions on an infrastructure controller 221 instance on behalf of an associated adapter 360. Such functions may include actuating the infrastructure controller 221 instance to create, destroy and remediate blueprint instances.

Agents 321 may also transmit state change notifications to an adapter 360 for infrastructure elements and heartbeat. In one embodiment, received state changes are maintained at database 350. Database 350 maintains an inventory of resources provided by each infrastructure controller 221 registered with management controller 210. In a further embodiment, database 350 maintains a cache of a state function of each resource associated with an infrastructure controller 221, as will be described in more detail below. Thus, any change in state of resource associated with the infrastructure controller 221 is forwarded to management controller 210, where it is stored in database 350.

Sometime after broadcasting the request, broker 330 receives proposals from one or more infrastructure controllers 221. In one embodiment, a proposal indicates a request by an infrastructure manager 221 to provide all or some of the requested resources that were broadcasted. For example, upon receiving a broadcast requesting 60 server resources, infrastructure controller 221A may propose providing 30 server resources, while infrastructure controller 221B may propose providing all 60 server resources. In one embodiment, solver engine 320 receives the proposals and determines which proposal and performs a mapping that best matches the Blueprint request. Subsequently, solver engine transmits a notification to client 117 from which the Blueprint was received via a notification engine 302. In a further embodiment, solver may select two or more proposals that match the request and forward for selection by a user at client 117.

Upon acceptance of a proposal, one or more adapters 360 facilitate instantiation of a resource instance with one or more infrastructure controllers 221 that will be providing the resources. Subsequently, the infrastructure controllers 221 assign the resources internally. For example, an accepted proposal may specify that 30 server resources are to be provided by infrastructure controller 221A and another 30 server resources are to be provided by infrastructure controller 221B. Thus, adapters 360 for infrastructure controller 221A and infrastructure controller 221B assign the required resources and forwards the resource assignments back to management controller 210, where the resource assignments are stored a database 340 by management engine 310 along with the associated Blueprint and blueprint instance.

Figure 5:
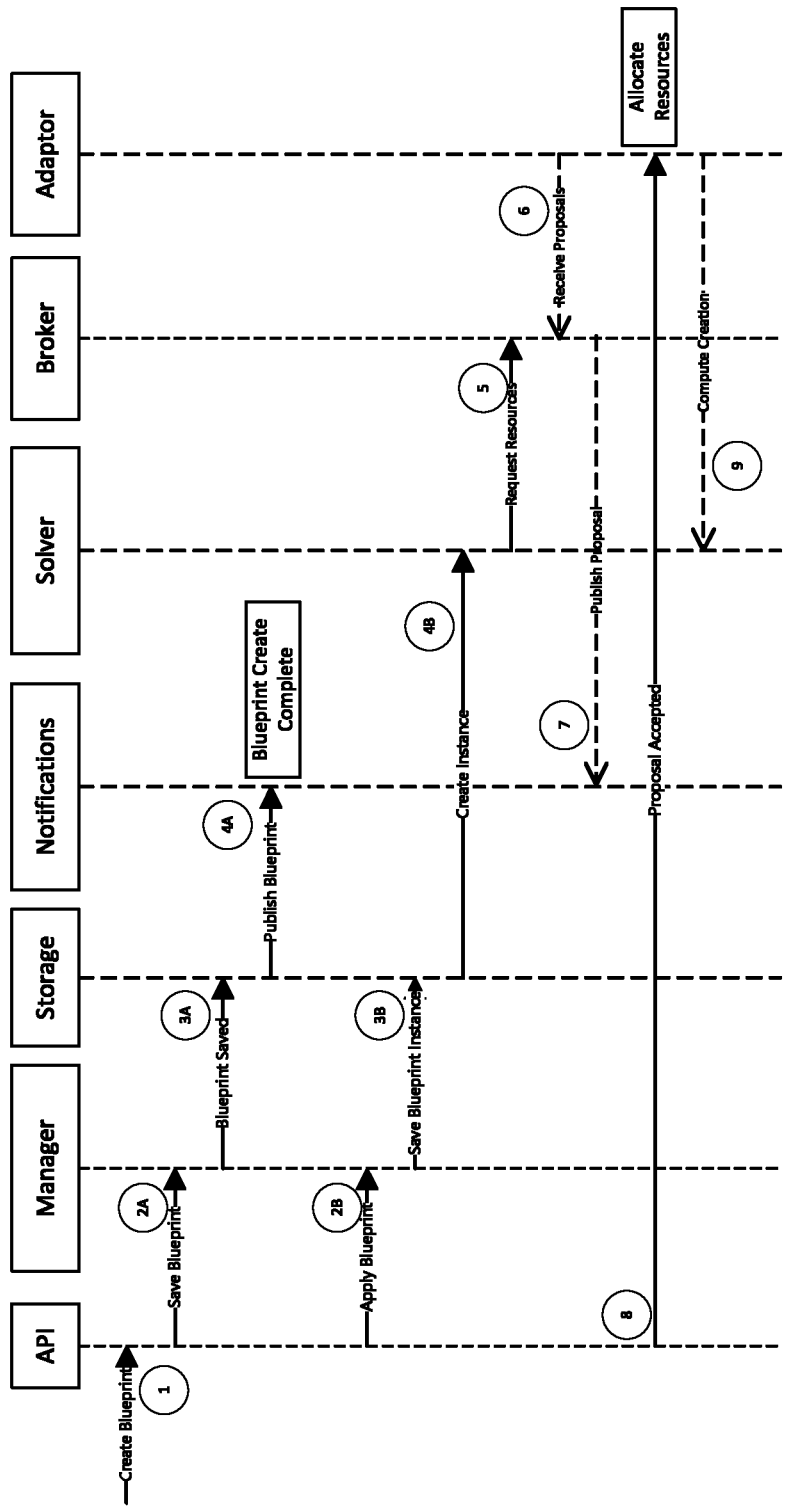
FIG. 5 illustrates one embodiment of a sequence diagram for operation of a management controller.

FIG. 5 illustrates one embodiment of a sequence diagram for operation of management controller 210. At stage 1, a Blueprint is created at API 301 (e.g., via a client). At stages 2A and 2B, the Blueprint is saved and applied at management engine 310, respectively. At stages 3A and 3B, the Blueprint and an associated Blueprint instance is saved to storage (e.g., database 340). At stages 4A and 4B, Blueprint creation is published and an instance of the request in the Blueprint is created, respectively. At this stage the Blueprint creation process has completed.

At stage 5, solver engine 320 transmits a resources request to broker 330, which subsequently broadcasts the request to infrastructure controllers 221 via adapters 360. At stage 6, proposals are received at broker 330 from the infrastructure controllers 221. At stage 7, the proposals are published via one or more notifications at notification engine 302. At stage 8, a notification indicating acceptance of the proposal is received at solver engine 320 via API 301 and forwarded to one or more infrastructure controllers 221 via adapters 360. As a result, the resources are allocated at the infrastructure controllers 221. At stage 9 a notification is received from the one or more infrastructure controllers 221 and published via notification engine 302 indicating to the client that the resources have been allocated.

According to one embodiment, the infrastructure management system is configured such that resource control (or control function) of all resources (hardware or software) is provided by each management controller in the system. As used herein, control function is defined as a function to initiate operations to be performed on resources within system 100. In a further embodiment, the state of the resources (or state function) is maintained at an infrastructure controller that controls the respective resources. As used herein, state function is defined as data associated with a current state (or status) of a resource within the infrastructure management system.

Figure 6:
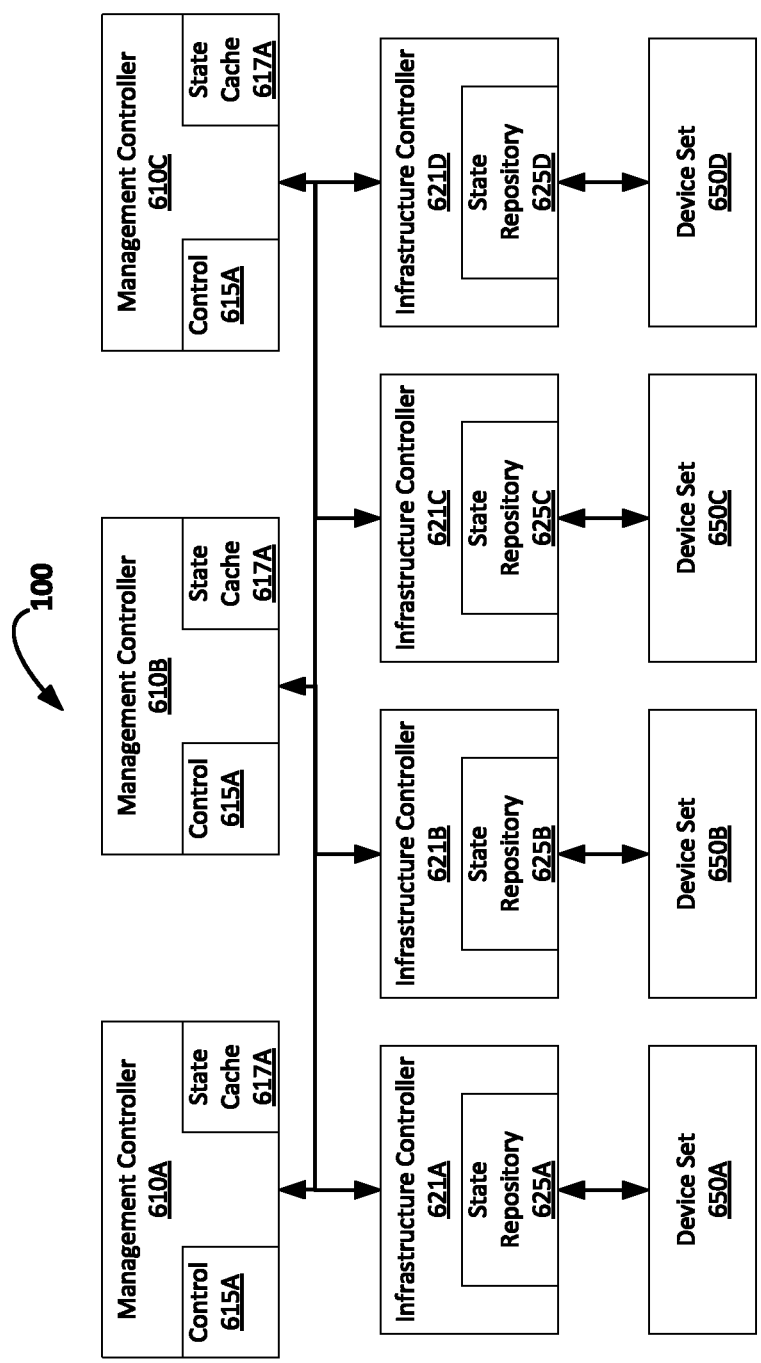
FIG. 6 illustrates still another embodiment of an infrastructure management system.

FIG. 6 illustrates another embodiment of infrastructure management system 100. As shown in FIG. 6, each infrastructure controller 621 is coupled to a device set 650, where each device set 650 includes one or more managed resources. Thus, infrastructure controller 621A-621D directly control device sets 650A-650D, respectively. In one embodiment, each device set 650 may reside within the same site as its respective infrastructure controller 621. However in other embodiments, one or more the device sets 650 may reside outside of the site of an infrastructure controller 621.

In one embodiment, each infrastructure controller 621 includes a state repository 625 to store the state function for each resource in its device set 650. For instance, infrastructure controller 621A includes a state repository 625A to store the state function for its device set 650A resources. The state function may include both control and soft state data. Control data comprises low level data that is used to drive a switch, device or application, where soft state data provides a representation of software configurations. For example, soft state data may include configuration information that is needed upon adding a network to a virtual switch (e.g., communication to the switch is permitted based on ownership information, network configuration, switch configuration).

Management controllers 610A-610C are coupled to each of the infrastructure controllers 621 and include a control function 615 that is implemented to control the device sets 650. Thus, the control function of the device sets 650 is de-coupled from the state function that is maintained at infrastructure controllers 621. De-coupling the control function and the state function results in lower latency for control functions of various devices, and enables infrastructure controllers 621 to scale up to a larger number of devices.

According to one embodiment, a management controller 610 may initiate a control operation on a particular resource in a device set 650 via an infrastructure controller 621. For instance, management controller 610A may initiate a read or write operation to resources in device set 650D via infrastructure controller 621D. An exemplary write operation may include a command to a switching device to define a network, while an exemplary read operation may include a command to a switching device to read its port statuses. Subsequently, infrastructure controller 621D performs the operation on the resources and updates the state information for those resources in state repository 625D. Infrastructure controller 621D then publishes the state of the updated state of the resource after the operation to all management controllers 610A-610C. In one embodiment, each management controller 610 includes a state cache 617 (e.g., maintained in database 350 in FIG. 3) to store a copy of the state information of resources in all of the device sets 650, including the published updated resource state. Thus, all management controllers 610 cache the state (e.g., control and soft state data) of all resources in system 100 resource. In such an embodiment, database 350 stores the updated resource state each time there is a change a state for a resource.

Figure 7:
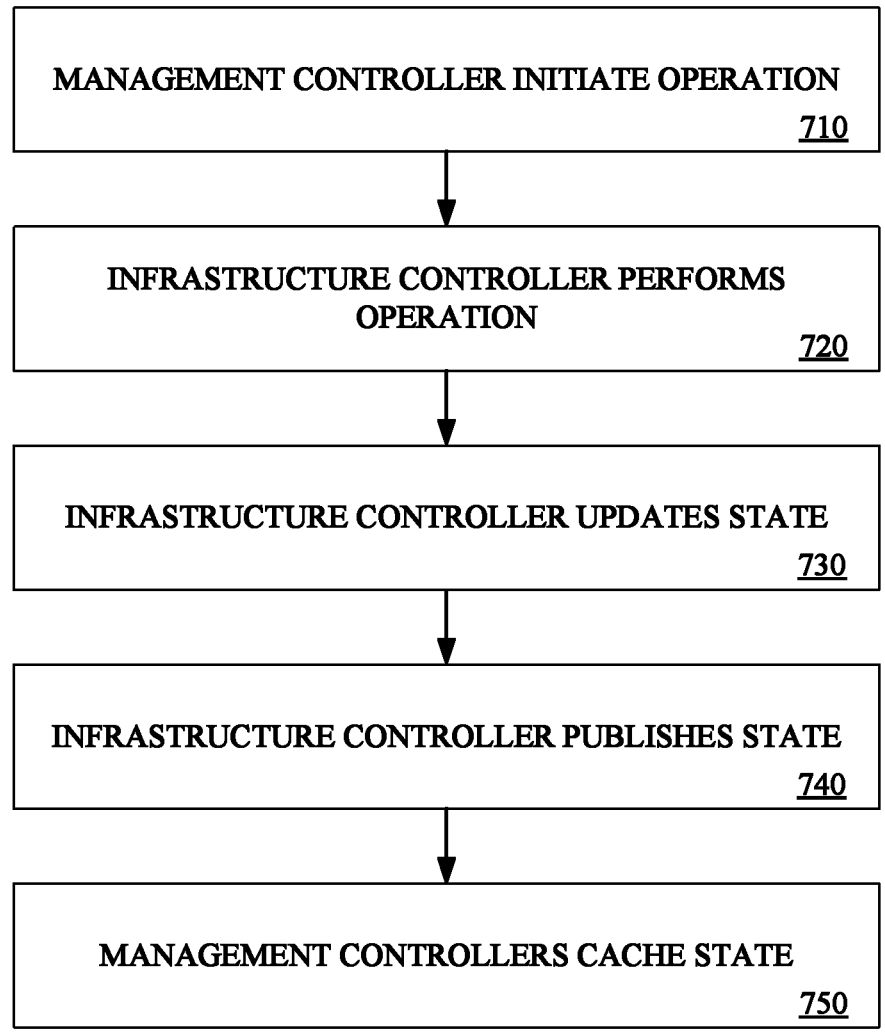
FIG. 7 is a flow diagram illustrating one embodiment of a process for performing an operation in an infrastructure management system.

FIG. 7 is a flow diagram illustrating one embodiment of a process for performing an operation in an infrastructure management system. At processing block 710, a management controller 610 initiates an operation to be performed on a resource in a device set. As discussed above, a management controller may initiate a read or write operation to resources in a device set associated with an infrastructure controller 621. At processing block 720, an infrastructure controller 621 associated with the device set performs the operation on the resource. For example, a switching device may define a network in response to a command operation. At processing block 730, the infrastructure controller 621 updates the state of the resource after the operation in its state repository 625. For example, state repository 625 is updated to reflect that the newly defined network. At processing block 740, the infrastructure controller 621 publishes the state to all management controllers 610. As a result, the state data for the define network as transmitted to all management controllers 610. At processing block 750, each management controller 610 updates its state cache 617. Thus, each state cache 617 is updated to include the state data for the define network. The above-described process eliminates a need for communication between management controllers 610, which significantly increases the availability, speed and security of the overall system 100 management.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method to facilitate infrastructure management, comprising:

performing, by a first management controller of a plurality of management controllers, a control function to initiate a command to perform an operation on a first set of resources;

receiving, by a first infrastructure controller associated with the first set of resources, the command;

performing, by the first infrastructure controller, the operation on the first set of resources;

in response to the operation performed by the first infrastructure controller, updating, by the first infrastructure controller, a state repository in the first infrastructure controller, wherein the updating of the state repository comprises updating state information of the first set of resources, wherein the updated state information comprises state data associated with a current state of the first set of resources, and control data related to operations on the first set of resources;

broadcasting, by the first infrastructure controller, the updated state information of the first set of resources to each management controller of the plurality of management controllers; and storing, by each respective management controller of the plurality of management controllers, the updated state information broadcast by the first infrastructure controller in a respective cache of the respective management controller, wherein the respective cache of each management controller of the plurality of management controllers stores state information of a plurality of sets of resources controlled by respective different infrastructure controllers including the first infrastructure controller.

2. The method of claim 1, comprising:

storing, by each management controller of the plurality of management controllers, the state information of all resources of the plurality of sets of resources controlled by the respective different infrastructure controllers, wherein a second infrastructure controller of the different infrastructure controllers controls a second set of resources, wherein the plurality of sets of resources includes the first set of resources and the second set of resource.

3. The method of claim 1, wherein the broadcasting of the updated state information to each management controller of the plurality of management controllers and the storing by each management controller of the plurality of management controllers the updated state information in the respective cache eliminates a need for communication between the plurality of management controllers.

4. The method of claim 1, wherein the operation responsive to the command comprises a read operation or a write operation, and the updated state information is responsive to the read operation or the write operation.

5. The method of claim 1, wherein the operation responsive to the command comprises a write operation to a switch that defines a network, and the updated state information is responsive to the write operation that defines the network.

6. The method of claim 1, wherein the operation responsive to the command comprises a read operation that reads a port status of a switch, and the updated state information is responsive to the read operation that reads the port status.

7. The method of claim 1, further comprising:

receiving, by the first management controller, a request to instantiate requested resources;

broadcasting, by the first management controller, the request to the different infrastructure controllers;

receiving, by the first management controller, respective proposals from the different infrastructure controllers, wherein each proposal of the proposals is responsive to the request and comprises information of resources that can be provided by a corresponding infrastructure controller of the different infrastructure controllers, wherein a first proposal from the first infrastructure controller is different from a second proposal from a second infrastructure controller of the different infrastructure controllers, and wherein a quantity of the resources referred to by the information in the first proposal is different from a quantity of the resources referred to by the information in the second proposal; and select, by the first management controller for the request, a proposal of the respective proposals from the different infrastructure controllers.

8. The method of claim 7, further comprising:

instantiating, by the first management controller in response to the request, the resources of the selected proposal with an infrastructure controller of the different infrastructure controllers.

9. A system to facilitate infrastructure management, comprising:

a plurality of management controllers each having a control function to initiate operations on a plurality of resources and a state cache to store state information of the plurality of resources, wherein a first management controller of the plurality of management controllers is to initiate a command to perform an operation on a first set of resources of the plurality of resources; and a plurality of infrastructure controllers, each having a state repository to maintain a state function of the plurality of resources, wherein the plurality of infrastructure controllers comprise a first infrastructure controller associated with the first set of resources to:

receive the command, perform the operation on the first set of resources, update a first state repository in the first infrastructure controller, wherein the updating of the first state repository comprises updating state information of the first set of resources in response to the operation, and broadcast the updated state information of the first set of resources to each management controller of the plurality of management controllers, wherein the updated state information comprises state data associated with a current state of the first set of resources, and control data related to operations on the first set of resources, wherein each respective management controller of the plurality of management controllers is to store the updated state information broadcast by the first infrastructure controller in a respective state cache of the respective management controller, wherein the respective state cache of each management controller of the plurality of management controllers stores state information of a plurality of sets of resources controlled by respective different infrastructure controllers of the plurality of infrastructure controllers.

10. The system of claim 9, wherein each management controller of the plurality of management controllers is to store the state information of all resources of the plurality of sets of resources controlled by the respective different infrastructure controllers, wherein a second infrastructure controller of the different infrastructure controllers controls a second set of resources, wherein the plurality of sets of resources includes the first set of resources and the second set of resource.

11. The system of claim 9, wherein the first management controller is a cloud controller.

12. The system of claim 11, wherein a second management controller of the plurality of management controllers is part of a data center that further comprises a second infrastructure controller of the plurality of infrastructure controllers and a second set of resources.

13. The system of claim 9, wherein the operation comprises an operation to a switching device to define a network, and the updated state information is responsive to the operation to the switching device to define the network.

14. The system of claim 9, wherein the operation comprises an operation to read a port status of a switching device, and the updated state information is responsive to the operation to read the port status.

15. The system of claim 9, wherein the first management controller is to further:
 receive a request to instantiate requested resources;
 broadcast, from the first management controller, the request to the plurality of infrastructure controllers;
 receive, at the first management controller, respective proposals from the plurality of infrastructure controllers, wherein each proposal of the proposals is responsive to the request and comprises information of resources that can be provided by a corresponding infrastructure controller of the plurality of infrastructure controllers, wherein a first proposal from the first infrastructure controller is different from a second proposal from a second infrastructure controller of the plurality of infrastructure controllers, and wherein a quantity of the resources referred to by the information in the first proposal is different from a quantity of the resources referred to by the information in the second proposal; and
 select, by the first management controller for the request, a proposal of the respective proposals from the plurality of infrastructure controllers.

16. The system of claim 15, wherein the first management controller is to, in response to the request, instantiate the resources of the selected proposal with an infrastructure controller of the plurality of infrastructure controllers.

17. A non-transitory machine-readable storage medium comprising instructions that upon execution cause a system to:
 initiate, at a first management controller of a plurality of management controllers, a command to perform an operation on a first set of resources;
 receive, at a first infrastructure controller associated with the first set of resources, the command;
 perform, at the first infrastructure controller, the operation on the first set of resources;
 in response to the operation performed by the first infrastructure controller, update, at the first infrastructure controller, a state repository in the first infrastructure controller, wherein the updating of the state repository comprises updating state information of the first set of resources, wherein the updated state information comprises state data associated with a current state of the first set of resources, and control data related to operations on the first set of resources;
 broadcast, from the first infrastructure controller, the updated state information of the first set of resources to each management controller of the plurality of management controllers; and
 store, at each respective management controller of the plurality of management controllers, the updated state information broadcast by the first infrastructure controller in a respective cache of the respective management controller, wherein the respective cache of each management controller of the plurality of management controllers stores state information of a plurality of sets of resources controlled by respective different infrastructure controllers including the first infrastructure controller.

18. The non-transitory machine-readable storage medium of claim 17, wherein the instructions upon execution cause the system to:
 store, at each management controller of the plurality of management controllers, the state information of all resources of the plurality of sets of resources controlled by the respective different infrastructure controllers, wherein a second infrastructure controller of the different infrastructure controllers controls a second set of resources, wherein the plurality of sets of resources includes the first set of resources and the second set of resource.

19. The non-transitory machine-readable storage medium of claim 17, wherein the instructions upon execution cause the system to:
 receive, at the first management controller, a request to instantiate requested resources;
 broadcast, from the first management controller, the request to the different infrastructure controllers;
 receive, at the first management controller, respective proposals from the different infrastructure controllers, wherein each proposal of the proposals is responsive to the request and comprises information of resources that can be provided by a corresponding infrastructure controller of the different infrastructure controllers, wherein a first proposal from the first infrastructure controller is different from a second proposal from a second infrastructure controller of the different infrastructure controllers, and wherein a quantity of the resources referred to by the information in the first proposal is different from a quantity of the resources referred to by the information in the second proposal; and
 select, by the first management controller for the request, a proposal of the respective proposals from the different infrastructure controllers.

20. The non-transitory machine-readable storage medium of claim 19, wherein the instructions upon execution cause the system to:
 in response to the request, instantiate, at the first management controller, the resources of the selected proposal with an infrastructure controller of the different infrastructure controllers.

* * * * *